April 14, 1970     L. SEILER     3,506,243

PREFABRICATED RAILING

Filed Nov. 26, 1968     7 Sheets-Sheet 1

Fig. 1

*INVENTOR.*
Lawrence Seiler

BY

*ATTORNEY*

April 14, 1970     L. SEILER     3,506,243
PREFABRICATED RAILING
Filed Nov. 26, 1968     7 Sheets-Sheet 2

INVENTOR.
Lawrence Seiler
BY
*Edward Getty*
ATTORNEY

April 14, 1970 L. SEILER 3,506,243
PREFABRICATED RAILING
Filed Nov. 26, 1968 7 Sheets-Sheet 3

INVENTOR.
Lawrence Seiler
BY

ATTORNEY

April 14, 1970     L. SEILER     3,506,243

PREFABRICATED RAILING

Filed Nov. 26, 1968     7 Sheets-Sheet 4

INVENTOR.
Lawrence Seiler

BY

ATTORNEY

April 14, 1970 L. SEILER 3,506,243
PREFABRICATED RAILING
Filed Nov. 26, 1968 7 Sheets-Sheet 5

INVENTOR.
Lawrence Seiler
BY
ATTORNEY

April 14, 1970        L. SEILER        3,506,243

PREFABRICATED RAILING

Filed Nov. 26, 1968        7 Sheets-Sheet 7

INVENTOR.
Lawrence Seiler

BY

ATTORNEY

United States Patent Office 3,506,243
Patented Apr. 14, 1970

3,506,243
PREFABRICATED RAILING
Lawrence Seiler, Cincinnati, Ohio, assignor to American Machine & Foundry Company, New York, N.Y., a corporation of New Jersey
Filed Nov. 26, 1968, Ser. No. 779,147
Int. Cl. E04h 17/14
U.S. Cl. 256—59                                    4 Claims

ABSTRACT OF THE DISCLOSURE

A railing fabricated from extruded metal sections having a post formed with two identical halves which are cammed together at either a horizontal or a right angle and channels connecting said posts with pickets or panels connecting said channels and said posts.

My invention relates to a prefabricated railing. In particular, my invention relates to railings, balustrades, fences, ornamental interlocking rails and partitions which are readily assembled using a minimum of tools and visible connections. In particular, my device has been designed to be fabricated from extruded metal sections, employing necessary interlocking between certain component parts, which interlocking takes advantage of springing quality inherent in the metal. Camming surfaces are provided so that the posts when forced together will be deflected until the interlocks seat. Other connections are provided by embodying in certain of the extrusions, an interrupted circle of metal designated as a screw groove so that the inside diameter is of a size to form a proper tape hole for a tapping screw.

Irregularities in the construction of a building are compensated for by sleeve type wall brackets with telescoping action. By this method compensation is made for variances in the distance between the walls from unit to unit, or for variances in the plumb in the vertical section at the levels where the top rail and the bottom rail engage the wall surface.

Similarly vertical adjustment is provided to keep the rails level where there are irregularities in the elevation of the floor on which the railing is mounted.

It is the principal object of my invention to provide a prefabricated extruded section employing a minimum of extruded shapes to permit wide variation in the style and pattern of the railing and means for automatically interlocking the elements.

Another object of my invention is to employ with these selected extruded shapes the picket type of railing, as well as panel railing.

Another object of my invention is to prefabricate and preassemble the railings to the post or baluster to simplify shipping and erection.

Still another object of my invention is to manufacture the panels so that they may be assembled in a straight line, or at right angles, utilizing the same post section.

A further object of my invention is to incur the benefits of tubular post construction without employing hollow or tubular shapes and utilizing hollow dies and thereby providing an economical method of manufacture.

A still further object is to form the post section from two pieces of the extruded material of substantially the same shape to form a square hollow section with a split diagonally across the square so that one of the sections may be inverted and changed from a straight line railing to a right angle railing, which halves of the post are secured together by means of an interlocking internal spline.

Therefore, another object of my invention is to apply a post at each end of a certain section in preassembly so that at the erection site it is only necessary to insert the internal spline and snap on the top rail to completely assemble the railing.

Other objects and details of construction will definitely appear from the detailed description to follow:

In the drawings.

In the drawings the same reference numerals refer to the same or similar parts through the several views and the sectional views are taken looking in the direction of the arrows at the ends of the section lines.

In general my invention consists of a railing to be used as a fence, balustrade or partition preassembled at a factory and easily assembled at the job site. Metal extrusions with built-in mechanical interlocks between certain of the parts provide a rigid rail. The mechanical interlocks are the result of camming surfaces on the extrusions which take advantage of the spring qualities inherent in the metal. Sleeve type wall brackets with telescoping action compensate for variances in the plumb of the vertical section at the levels where the top rail and the bottom rail engage the wall surface. Similarly, a telescoping foot allows adjustment without unsightly gaps to keep the rails level where there are irregularities in the elevation of the floor on which the railing is to be mounted. The posts to which the rails are secured are made into two parts and by adjusting the position of each of these parts relative to each other the railings may be horizontal or they may be made at right angles using the same parts.

Figure 1:
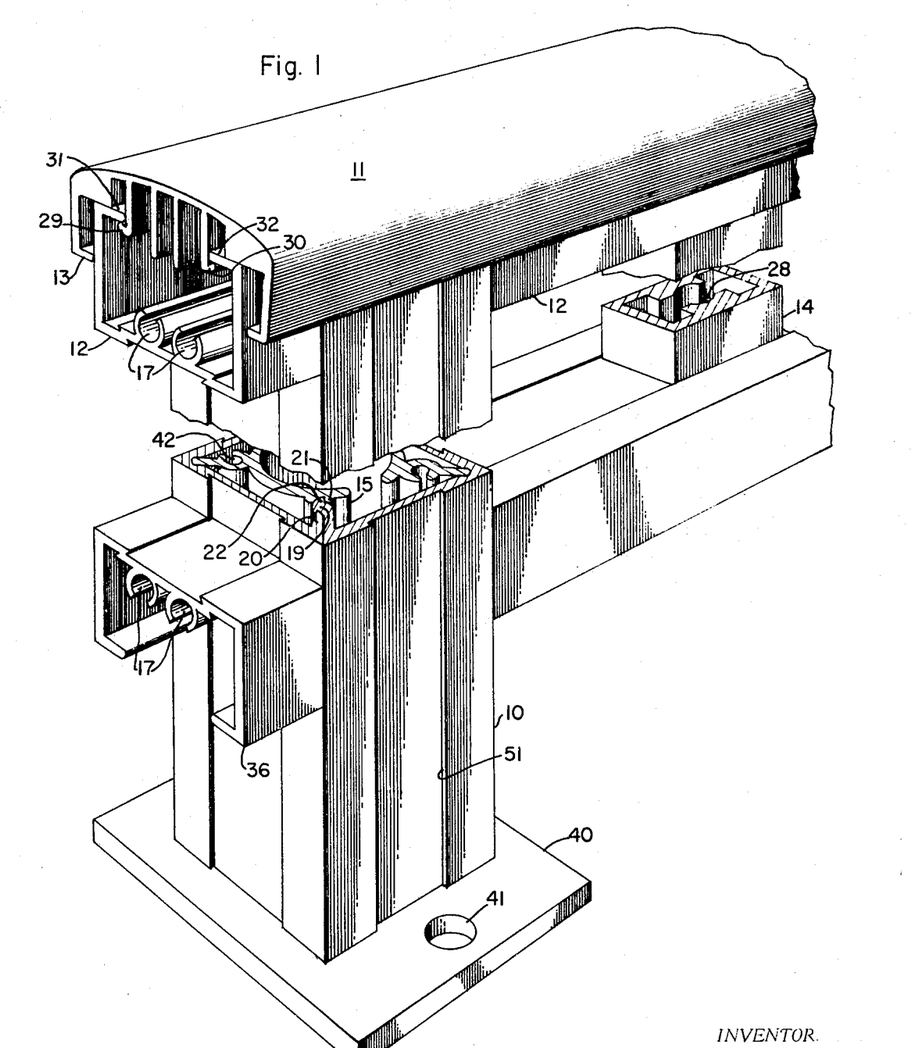
FIGURE 1 is a perspective view of the railing with portions in section.

Referring to the numbered parts of the drawings, I show in FIGURE 1 a post 10 comprising two sections. This post is formed by joining two extrusions as will be explained in further detail below.

The railing indicated generally at 11 comprises extruded members such as 12 and 13.

Figure 5:
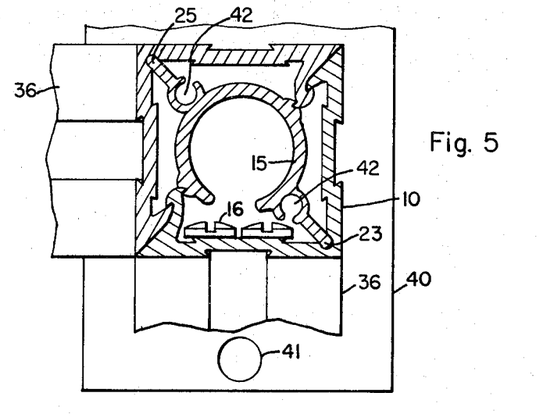
FIGURE 5 is a detailed, sectional view taken along the lines 5—5 of FIGURE 2.

The posts 10 are connected by two or more channels such as 12 and the space between the channels is separated by pickets such as 14, or by a variety of panels, or a combination of structural members. The post 10 is formed of two extrusions joined together by internal splines 15. By changing the side to which the channels are attached on one of the sections of the one-half post extrusion, it is possible to change from 180° extension of the railing to a 90° turn in either direction. This is illustrated in FIGURE 5.

The channel 12 is connected to the post 10 by running tapping screws 16 through holes punched in the post in the screw grooves 17, which are part of the channel 12. Each section is made up separately with one piece of post 10 at each end unless it is an end panel and supported by a wall of the structure, in which case it will have only one and one-half posts at one end and wall brackets, which will be described, are utilized at the other end.

Figures 10, 12:
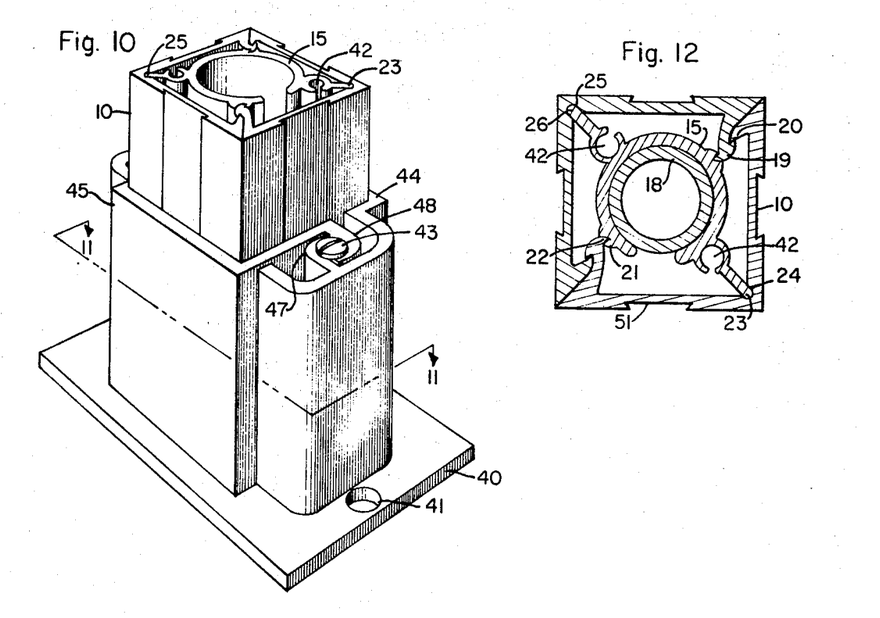
FIGURE 10 is a perspective view of the foot.
FIGURE 12 is a section of the post, spline and pipe.

In FIGURE 12 I show an iron pipe 18 in the center of the spline 15. Corner ribs 19 and corner ribs 20 interlock the post so that the post may be slidably moved down and to the right or up and to the left. Sliding the member 18 between the corner ribs makes it possible to move the two pieces of posts and securely locks them.

Normally, the posts are hooked together and the spline member 15 slid down in the center with the notch 21 on the spline 15 engaging the tooth 22 of the rib 19.

It is one of the purposes of this invention to assemble the two pieces of post without using head room necessary to slide the spline member 15 down inside the assembled post. This is accomplished by snapping the spline 15 into one portion of the post 10 and then by squeezing or tapping the other piece of post into place to get a snap fit. The spline member 15 will snap into place in one piece of post by putting the end of the rib 23 into the grooved out corner 24 of one-half of the post 10 and by putting the end of the rib member 25 into the grooved out corner 26 of the other one-half of the post and pushing the spline toward the rib 19 of the one-half post.

The action of the member 21 on the spline 15 against the edge of the rib 19 results in a camming action which deflects the metal until the tooth on the rib drops into the notch in the boss, providing a snap fit. The spline is then firmly held in this position.

The other section of the post 10 can then be brought into position so that the end of the rib 20 of the second section slips into the opposing notch of the rib 19 of the first post section. Then by squeezing or tapping the two sections together, the rounded head of the rib 19 of the second one-half post forms a double camming surface against the rounded surfaces of the boss on the member 21 of spline 15 and the rib 20 of the first post deflecting the metal by camming them apart until the head has penetrated the opening to the point where the tooth on one side of the rib 19 drops into the notch in the boss 21 in the spline and the tooth on the other side drops behind the rib 20 of the first post section.

Figure 4:
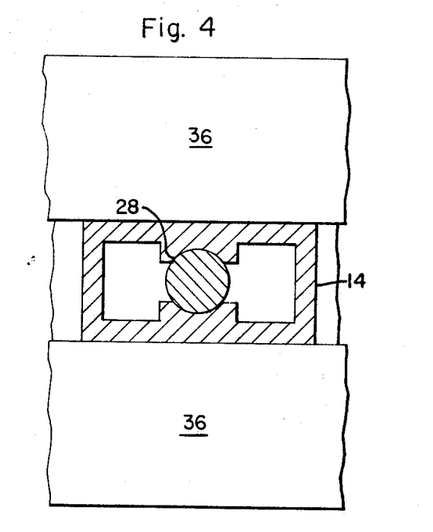
FIGURE 4 is a detailed, sectional view taken along the lines 4—4 of FIGURE 2.

The picket 14 is a tubular extension shown in cross section in FIGURE 4. The side walls are projected from each side toward the middle and faced with a rounded section 28.

Figure 3:
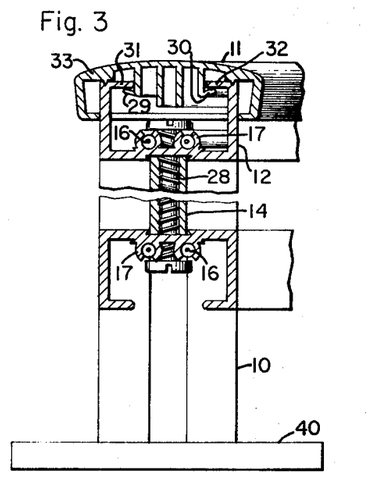
FIGURE 3 is a detailed, sectional view taken along the lines 3—3 of FIGURE 2.

After the entire railing is installed the rail cap 11 is snapped on top of the channel 12. This rail cap 11 is squeezed or tapped so that the two vertical ribs 29 and 30, FIGURE 3, are positioned between the horizontal ribs 31 and 32 of the channel. The rounded enlarged ends of the vertical ribs 29 and 30 cam the horizontal ribs 31 and 32 apart deflecting the metal until the enlarged portion of the vertical ribs 29 and 30 pass the ends of the horizontal ribs on the channel and they are allowed to snap back to their original position, providing a secure snap fit.

Figure 2:
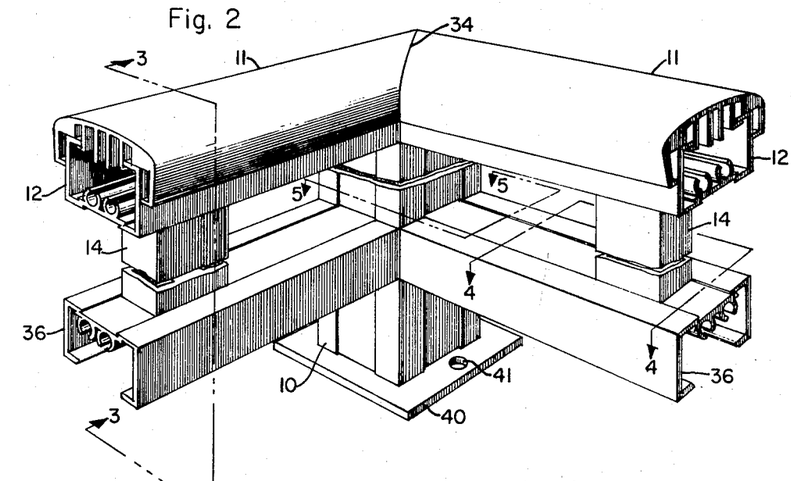
FIGURE 2 is a perspective view of the railing showing a right angle post.

At the same time the small V-shaped positioning rib 33 positioned on either side of the rail cap drops into the matching V-shaped groove on top of channel 12. When these engage it tends to prevent the channel of the rail from spreading when external downward pressure is applied to the rail. Also, if the snap fit should become loose due to either imperfect extrusions or deformation of either channel 12 or the rail cap 11, a tight connection between the rail cap 11 will be effected by inserting a tapping screw through the center of the web of the channel. When a right angle device is made as shown in FIGURE 2, the rail cap is mitered as at 34 with heliarc tack welded on the ribs 29 and 30. Thus a strong corner connection is made without the need of extra materials, field assembly or grinding to obtain a proper finish.

Figures 6, 7:
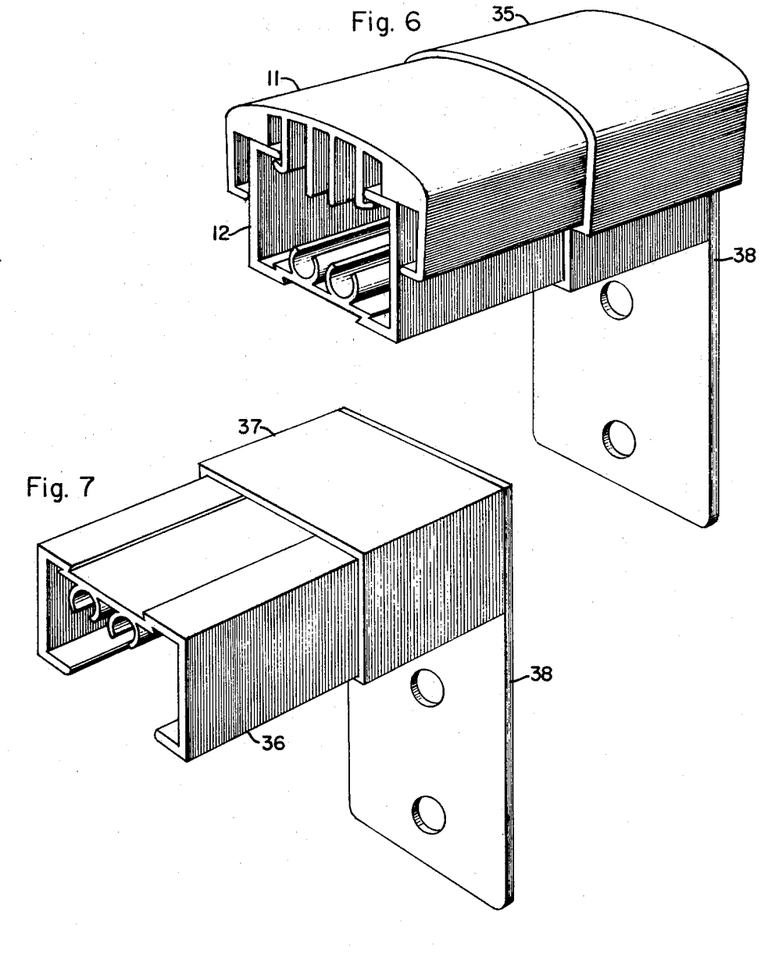
FIGURE 6 is a view of a channel member.
FIGURE 7 is a perspective view of a wall bracket.

In FIGURE 6 I illustrate the attachment of the rail to the wall at the end of a section. The rail cap 11 and the channel 12 go into an extruded wall bracket 35 shown in section in FIGURE 8.

Figure 9:
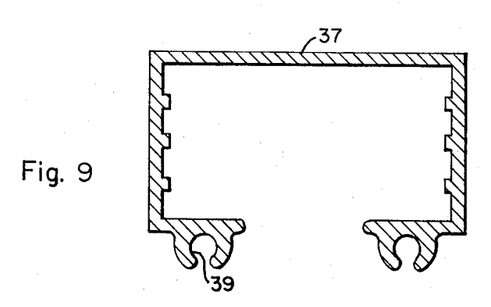
FIGURE 9 is a section of the lower wall bracket extrusion.

The channel 36 shown in FIGURE 7 goes into the bottom wall bracket 37, which is shown in section in FIGURE 9.

Figure 8:
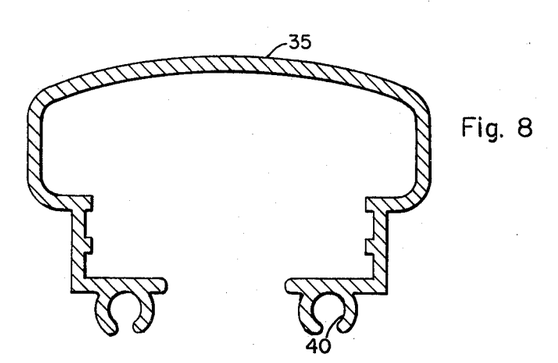
FIGURE 8 is a section of the upper wall bracket extrusion.

Both the top and bottom wall brackets 35 and 37 are attached to a wall bracket plate 38 by means of a tapping screw which is positioned in the plate and threaded into screw grooves 39 and 40, as shown in FIGURES 8 and 9.

Since there can be a telescoping action between the channel 12 and the rail cap 11 assemblies and the upper and lower wall bracket sections and since the wall bracket sections can be adjusted to any desirable length, it is possible to adjust for variances in the walls, both from the top to the bottom of the same end of the railing, or from unit to unit, when such adjustments are required.

The railing can be attached to a deck in a building in several ways.

Figure 21:
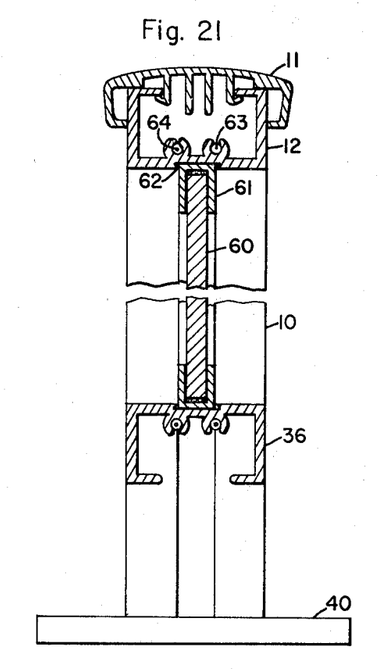
FIGURE 21 is a detailed, sectional view taken along the lines 21—21 of FIGURE 15.

In FIGURE 1, I show a footer member 40 fabricated from a piece of aluminum bar stock which has holes 41 for mounting. Referring to FIGURE 21, four holes (not shown) are drilled or punched in the footer near the end to be used as mounting holes and two are used exactly to line up with the screw grooves 42 in the spline 15. These two holes are counter sunk and two flat head tapping screws, such as 43, are run through the clearance holes in the foot into the screw grooves in the spline 15, where they cut threads and make a secure attachment.

In FIGURE 10, I show an adjustable shoe made up of two sections of shoe extrusions 44 and 45, plus a foot 40 identical with the previous described foot, except that the counter sunk holes may be aligned with the screw grooves 46 which is formed when the two pieces of extrusions 44 and 45 are put together.

Figure 11:
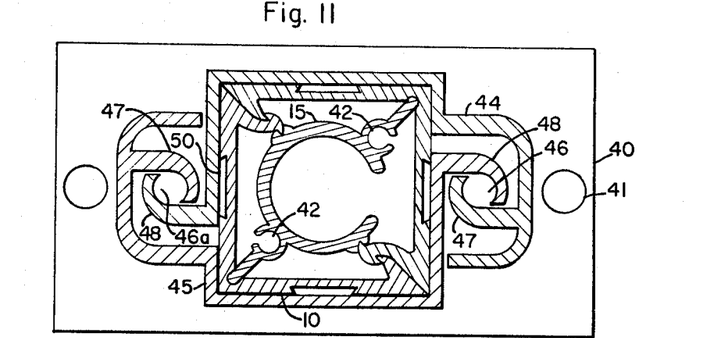
FIGURE 11 is a detailed, sectional view taken along the lines 11—11 of FIGURE 10.

In FIGURE 11, I show a section so that the hook shaped ribs 47 and 48 form a doubly interrupted circle or screw grooves such as 46 and 46A at each end. When a screw of the proper size is placed in this screw groove it acts as a wedging force, forcing the right hand section 44 to the left and the left hand section 45 to the right, thus clamping the post sections between the two shoe sections. The screw cuts threads holding the post sections so that they do not slide vertically with respect to each other and also securely holds them to the foot 40. The sections are attached to the foot prior to delivery to the job site. The assembled post 10 is started in and then driven between members 45 and 44 to the desired depth to erect a level rail and two screws such as 43, FIGURE 10, are run in from the top, clamping the post securely. To rigidly secure each shoe a boss such as 50 is provided, which fits snugly into a groove 51 in the post sections 10. When the rail is mounted on a concrete deck and mounting holes are left at predetermined levels, a heavy duty pipe 18, shown in FIGURE 12, is inserted against the spline member 15 and runs below the bottom of the post on the spline into the hole provided in the concrete deck. It is then grouted and the railing is held up from the surface of the concrete to allow finishing of the surface of the grout.

After the grout has hardened the rail is forced down on the spline 15 until the bottom of the post is flush on the surface of the concrete deck. When the deck is concrete and the simple foot 40 is used, holes are drilled in the concrete for utilizing lag screw shields, tampit plugs, wedge bolts, or other devices designed to provide a secure connection in the masonry and the shoes such as 44 and 45 are bolted to the deck.

Figure 13:
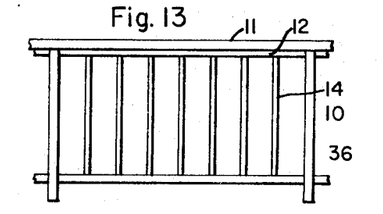
FIGURE 13 is a view of a post type railing.
Figure 14:
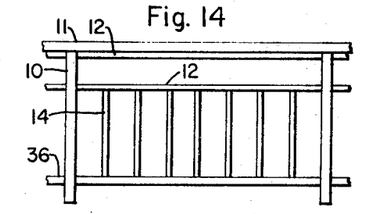
FIGURE 14 is a view of a sectional panel railing.

FIGURES 13 through 20 illustrate standard designs of railings which may be formed utilizing the extrusions of my invention. Sections through railings illustrated in FIGURE 13 are shown in the drawings in FIGURES 3, 6 and 7.

Figure 15:
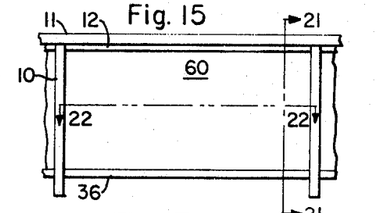
FIGURE 15 is a view of a panel type railing.
Figure 16:
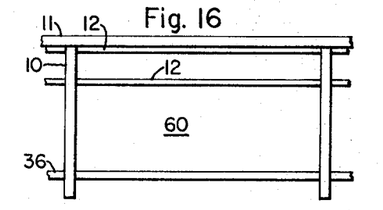
FIGURE 16 is a view of a panel type railing.
Figure 17:
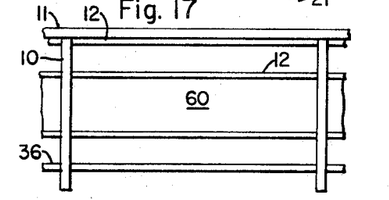
FIGURE 17 is a view of a panel type railing.

In FIGURE 21, I show a section through the panel type railing illustrated in FIGURE 15.

Figure 22:
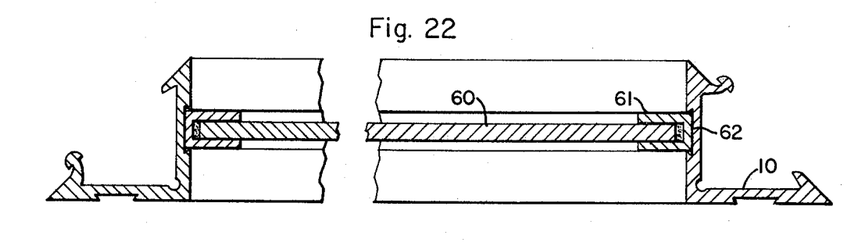
FIGURE 22 is a detailed, sectional view taken along the lines 22—22 of FIGURE 15.

FIGURE 22 also shows a section of the panel type railing illustrated in FIGURE 15.

The panel 60 is held in a panel retaining channel 61 which fits into the panel groove 62 of the channel 10 and is secured by tapping screws such as 63 and 64.

In FIGURE 21, we show a panel which is slidably fit into a channel 61, which fits into a post such as 62, which is held in place by means of screws such as 63 and 64, which are integral with a channel such as 36 and a channel such as 12 the panels may be sealed by suitable sealing methods. A horizontal section of the same railing is shown in FIGURE 22, where the panel 60 is held in the panel retaining channel 61, which fits into the panel groove 62 of one-half of the post 10. By utilizing the other half of the post 10, right angles may be formed between the panels.

Figure 18:
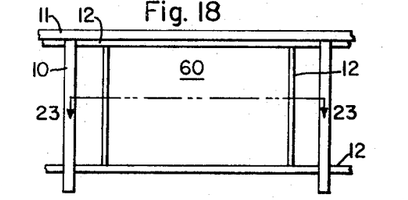
FIGURE 18 is a view of a panel type railing.
Figure 19:
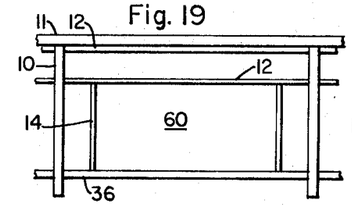
FIGURE 19 is a view of a panel type railing.
Figure 20:
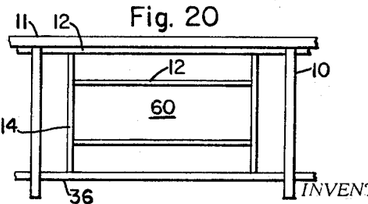
FIGURE 20 is a view of a panel type railing.
Figure 23:
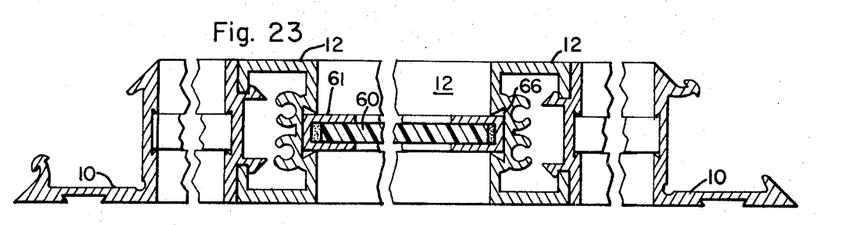
FIGURE 23 is a detailed, sectional view taken along the lines 23—23 of FIGURE 18.

FIGURE 23 shows a detailed sectional view of the paneling illustrated in FIGURE 18. The panel 60 is retained in the panel retaining channel 61, which fits into a panel groove such as 66. In this illustration the verticals, as well as the horizontals, are channels 12 and the back of the channel is closed off with a channel closure or rail cap as 11, illustrated in FIGURE 6. This rail cap 11 snaps on the channel 12 in the same manner as heretofore described.

Figure 24:
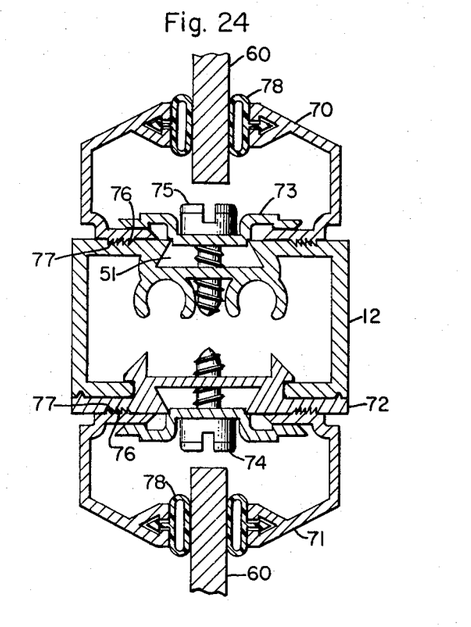
FIGURE 24 is a sectional view of an alternate method of panel retention.

FIGURE 24 illustrates an alternate method of installing the panels and is advantageous when it is desired to retain panels of ⅛ to ⅜ of an inch thick. In this embodiment, the panels can be removed or replaced without disassembly of the railing. The panels are retained in this embodiment by adjustable snap in glazing beads 70 and 71 and are held tightly against the face of the channel closure 72, or a portion of the channel 12, by means of a glazing bead adaptor 73, which is positioned into the channel groove 51 of the post 10. The glazing bead adaptor screws 74 and 75 hold the panel groove to the channel closure or post. There is a tooth 76 on the glazing bead 70 and 71 which engages a series of ratchet grooves 77 on either side of the panel groove or the face of the channel or the post. This tooth and ratchet groove is designed to be perpendicular to the face of the channel 12 on the one side and at an angle of 45° on the other. This makes it possible to squeeze the two glazing beads together with a ratchet action until they make a tight fit with the panel and hold it in position.

The glazing bead 70 and 71 has a groove that receives a vinyl type seal member 78, which is compressible to procure a tight fit.

Having thus described my invention, what I claim as new and useful and desire to secure by United States Letters Patent is:

1. A rail construction, comprising a plurality of spaced apart vertical posts, each of said posts comprising an extrusion, each of said extrusions having a pair of side walls at right angles, each of said extrusions having a groove on the outer surface of each wall, each of said extrusions having a pair of projections extending inwardly from the edge of each of the side walls, one of said projections having a boss extensible from said projection and mating with a projection on the other projection of said pair of side walls to form a square post, a tubular section having a portion of its surface removed for its entire length, radial projections extending from the surface of said tubular structure, the inner surface of each of said side walls having a groove at the point where the side walls join, each of said projections, on each of said walls, having a groove, said tubular section having a pair of grooves, said projections on said side walls adapted to slide into the grooves on said tubular section, and said projections on said tubular section, adapted to slide into the grooves on said side walls to lock said tubular section to said side walls and lock said side walls and tubular section to form a post.

2. The structure as described in claim 1, wherein the side walls have slots, a connecting rail having a boss at each of its ends adapted to slidably fit into the slots into said side walls, and means for securing said side walls to said rails at each end of said connecting rail.

3. The structure described in claim 1, adapted to be slidably fit over a tubular member, and a base to which said tubular member is secured.

4. The structure described in claim 2, wherein the connecting rail between said posts comprises an extrusion, a top member, a pair of projecting members secured to said top member at its inner surfaces, said projections adapted to slide over the inwardly projected surfaces of the rail to form a lock between said top member and said rail.

References Cited

UNITED STATES PATENTS

| | | | |
|---|---|---|---|
| 2,655,345 | 10/1953 | Lindman | 256—22 |
| 3,037,593 | 6/1962 | Webster. | |
| 3,113,760 | 12/1963 | Huret et al. | 256—21 X |
| 3,136,395 | 6/1964 | Rebele | 52—731 |
| 3,143,165 | 8/1964 | Lewis et al. | 52—731 X |
| 3,216,170 | 11/1965 | Deadrick. | |
| 3,305,221 | 2/1967 | Kling | 256—24 X |
| 3,343,811 | 9/1967 | Kusel et al. | 256—22 |
| 3,349,538 | 10/1967 | Crossman | 256—59 X |
| 3,420,505 | 1/1969 | Jefferys | 256—22 |

DENNIS L. TAYLOR, Primary Examiner

U.S. Cl. X.R.

256—65

UNITED STATES PATENT OFFICE
CERTIFICATE OF CORRECTION

Patent No. 3,506,243 April 14, 1970

Lawrence Seiler

It is certified that error appears in the above identified patent and that said Letters Patent are hereby corrected as shown below:

In the heading to the printed specification, lines 3 to 5, "Cincinnati, Ohio, assignor to American Machine & Foundry Company, New York, N. Y., a corporation of New Jersey" should read -- 7226 Harrison Avenue, Cincinnati, Ohio 45239 --.

Signed and sealed this 22nd day of December 1970.

(SEAL)
Attest:

Edward M. Fletcher, Jr.
Attesting Officer

WILLIAM E. SCHUYLER, JR.
Commissioner of Patents